United States Patent [19]

Gilmore et al.

[11] Patent Number: 5,618,188

[45] Date of Patent: Apr. 8, 1997

[54] CONNECTOR FOR A SELF CONTAINED LASER GYRO

[75] Inventors: Thomas A. Gilmore, Plymouth; Balu K. Iyer, Eden Prairie, both of Minn.

[73] Assignee: Honeywell Inc., Minneapolis, Minn.

[21] Appl. No.: 328,754

[22] Filed: Oct. 24, 1994

[51] Int. Cl.[6] .................................................. G01C 19/70
[52] U.S. Cl. ............................................. 439/91; 361/790
[58] Field of Search ............................. 439/66, 74, 91; 361/784, 785, 790; 356/350

[56] References Cited

U.S. PATENT DOCUMENTS

| | | | |
|---|---|---|---|
| 3,541,222 | 11/1970 | Parks et al. | |
| 4,218,724 | 8/1980 | Kaufman | |
| 4,225,900 | 9/1980 | Ciccio et al. | 439/72 |
| 4,249,302 | 2/1981 | Crepeau | 29/830 |
| 4,581,679 | 4/1986 | Smolley | 439/66 |
| 5,173,745 | 12/1992 | Hanse | 356/350 |
| 5,345,366 | 9/1994 | Cheng et al. | 361/785 |

FOREIGN PATENT DOCUMENTS 248521   12/1987   European Pat. Off. .

OTHER PUBLICATIONS

IEEE Plans '90 Position Location and Navigation Symposium, "The 1990's–A Decade of Excellence in the Navigation Sciences" dated Mar. 20, 1990.

The CIN::APSE Standard Products document dated 1991.

*Primary Examiner*—Neil Abrams
*Attorney, Agent, or Firm*—Thomas A. Rendos

[57] ABSTRACT

A multi piece electrical connector for use in a compact laser gyro. A connector unit, along with connectors 34A–C and paddle board 32, make a connection between the power supply and the dither motor 22 through wires 28 in the connector unit. The connector unit 30 includes a pair of connector substrates 34A, 34B used to sandwich a connector slug 36 to form a connector for connecting two printed wiring boards 38, 40.

4 Claims, 5 Drawing Sheets

CONNECTOR FOR A SELF CONTAINED LASER GYRO

BACKGROUND OF THE INVENTION

This application is related to U.S. patent application 08/328,755 entitled COMBINED SUPPORT PLATE AND PRINTED WIRING BOARD FOR A SELF CONTAINED LASER GYRO and U.S. patent application 08/328,752 entitled DITHER MOTOR CONNECTOR FOR A SELF CONTAINED LASER GYRO filed on the same day by the same inventors and commonly assigned with the present application.

This invention is directed to the field of laser gyros and more particularly to a laser gyro which is contained in a package with its support electronics.

Laser gyros have attained wide acceptance as high quality, high accuracy navigation devices. Systems which originally used ring laser gyros could occupy an area of four cubic feet or more and generally weighed several pounds.

Such a large system would not work in certain applications, such as missles and satellites. Only a small, lightweight navigation system will work in these circumstances.

Accordingly, small laser gyro systems have been developed, such as the Honeywell GG1308, which is described in 9GG1308 *Article* by Thielman and Oelschlaeger. Such a laser gyro has size and weight advantages. But these advantages come at the expense of performance.

Larger gyros, which generally provide better performance, have been previously packaged such that only the laser block itself with any onboard circuitry is packaged within a hermetically sealed container. Other electronics were connected to the laser block, but resided outside the sealed container. Making connections to the block while retaining the seal thus became difficult.

It therefore became desirable to have a high performing, laser block co-located within the hermetically sealed container with its major support subsytems such as the power supply, path length control circuits, laser intensity monitor circuits and the like. This was to be accomplished while maintaining a small, lightweight system.

SUMMARY OF THE INVENTION

The present invention is an electrical connector unit for directly connecting two printed wiring boards. The electrical connector unit includes two connector substrates and connector slug. The connector substrates are made from thin wafers of a dielectric material. Hard conductors pass through the wafers and extend a small amount above and below the surface of the wafer.

The slug is interposed between the two substrates. Conductors of a soft material pass through the slug and are laid out in a pattern which matches the pattern of conductors used in the substrates.

DETAILED DESCRIPTION OF THE PREFERRED EMBODIMENT

Figure 1:
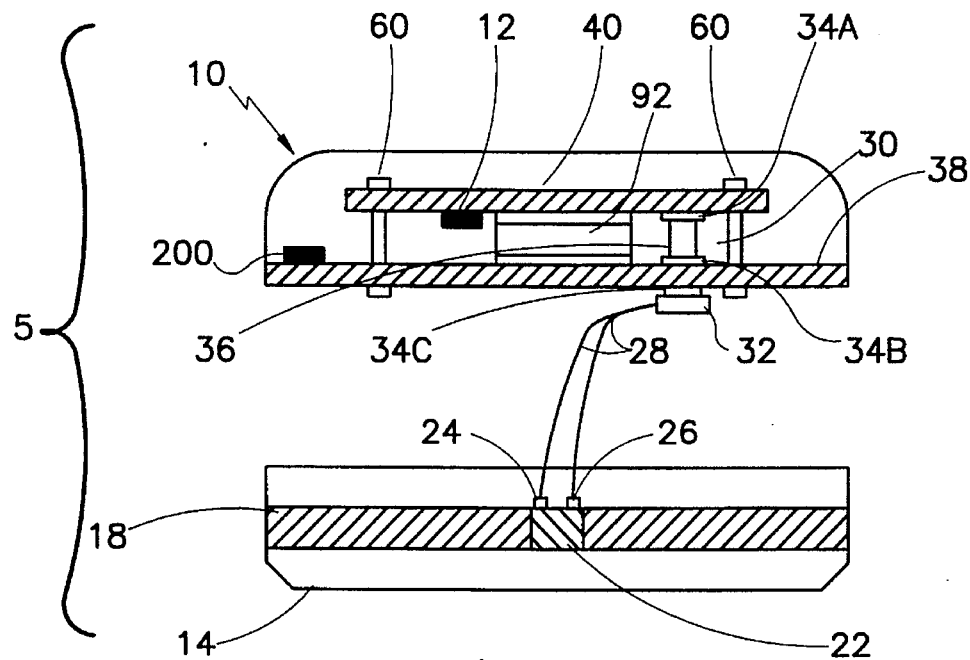
FIG. 1 is a side view of a laser gyro case having a top removed from a bottom.

Referring now to FIG. 1, there shown is a laser gyro unit 5 built using the present invention. The laser gyro unit 5 includes cover 10, power supply 12, base 14, laser gyro 18, dither motor 22, drive piezo 24, pickoff piezo 26, wires 28, paddle board 32, connector unit 92, cnnector unit 30 which includes three connectors 34, designated 34A, 34B and 34C and slug 36, first printed wiring board 38 and second printed wiring board 40.

Cover 10 contains support electronics printed wiring board 38 and power supply printed wiring board 40. The two printed wiring boards may be connected together by fasteners 60. Generally, one printed wiring board may hold digital support electronics 200 while the other may hold a power supply 12. In the present arrangement, it is preferred that the power supply be located on printed wiring board 40. The power supply 12 provides power for the laser gyro and the dither motor 22, among others. In order to get the power from the power supply printed wiring board 40 to the dither motor 22 and the digital electronics printed wiring board 38, the inventive connector units 92 and 30 along with the connectors 34A, 34B, and 34C and paddle board 32 were developed.

Figure 1A:
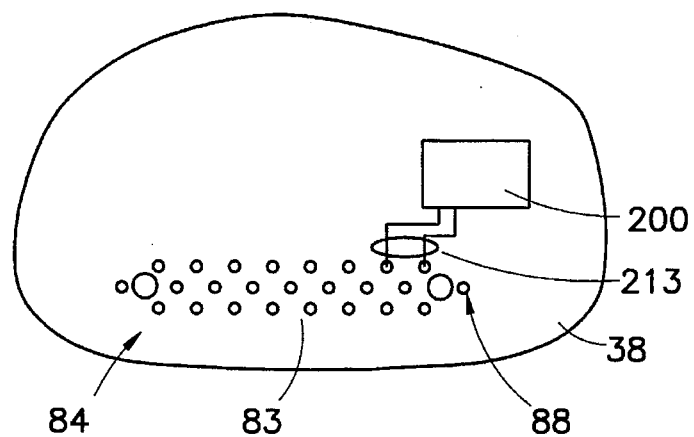
FIG. 1A is a top view of a first printed wiring board shown in FIG. 1.

In FIG. 1A, a top view of the digital electronics printed wiring board 38 is shown. Only elements necessary for purposes of this description have been shown. Printed wiring board 38 has support electronics 200 connected by conductive paths 213 to conductive pattern 84 which includes conductive pads 83, and holes 88. The conductive pads 83 are preferably made from gold. The bottom of the printed wiring board has at least some of the conductors laid out in a similar pattern and the conductors which show up on the bottom in fact pass through the printed wiring board.

Figure 1B:
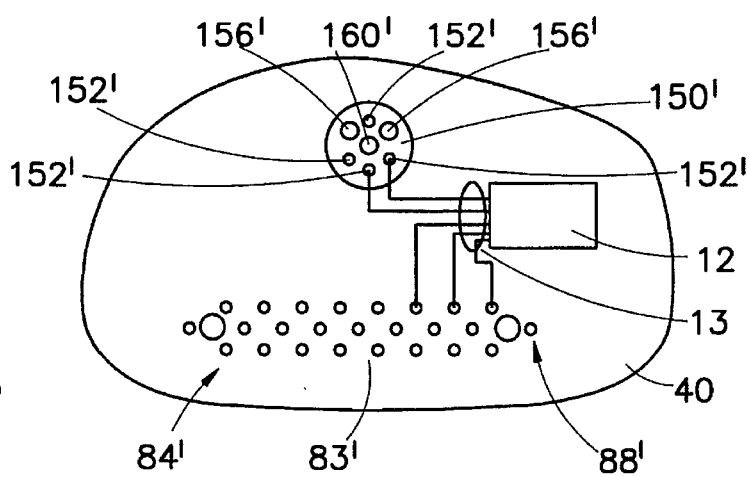
FIG. 1B is a bottom view of a second printed wiring board.

FIG. 1B shows the power supply wiring board 40. Note from FIG. 1A that printed wiring board 38 may be substantially identical to the printed wiring board 40 details shown except that the conductive pad pattern 84 need not pass through printed wiring board. Power supply 12 is connected by conductive paths 13 to at least two of the conductive pads 152' of contact pad 150' which also includes holes 156' and hole 160 '. Looking at FIGS. 1, 1A and 1B, the power supply 12 is also connected to the conductive pad pattern 84' which is connected to another connector unit 92 which completes the power supply path. The power supply path starts with the power supply 12 through the conductive paths 13 to the conductive pad 83' in the power supply wiring board 40. The power then goes from the conductive pads 83' through a connector unit 92 to conductive pads 83 of the digital electronics wiring board 38 in which the power then travels to the digital electronics 200 through the conductive paths 213.

Figure 2:
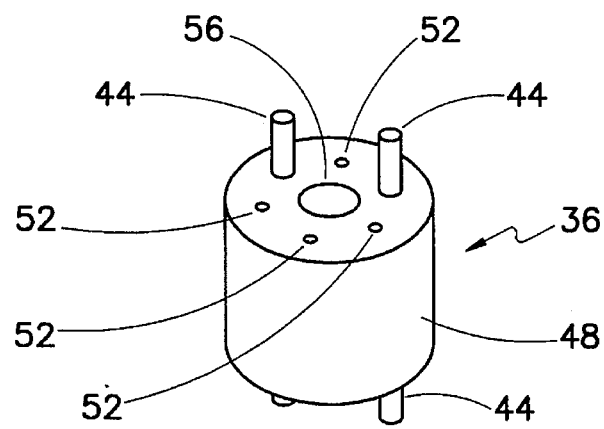
FIG. 2 is a perspective view of a substrate slug.
Figure 3:
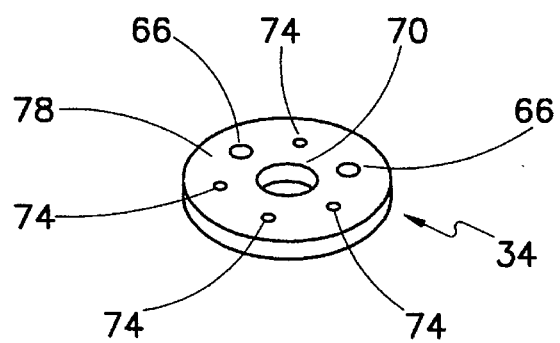
FIG. 3 is a perspective view of a connector substrate.

As can be seen with further reference to FIGS. 2 and 3, Connector Unit 30 includes two connectors 34A and 34B and a slug 36. Slug 36 includes a body 48, rods 44 conductors 52 and hole 56. The body 48 is shown here as a cylinder made of a dielectric materials such as glass filled polyester or plastic. Conductors 52 are formed through the body and correspond to a pattern of contacts (see for example FIG. 4) located on the printed wiring boards. The conductors may be inserted into the body and are made of a material with good electrical conductance such as copper with gold plating. Rods 44 are inserted into the body to allow for easy alignment of the slug 36 with the connectors 34 and the printed wiring boards 38 and 40.

Figure 1C:
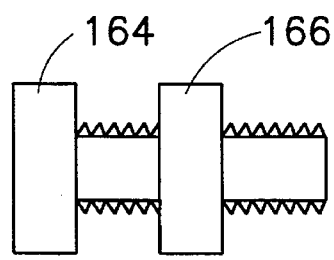
FIG. 1C is a side view of a nut and bolt.
Figure 1D:
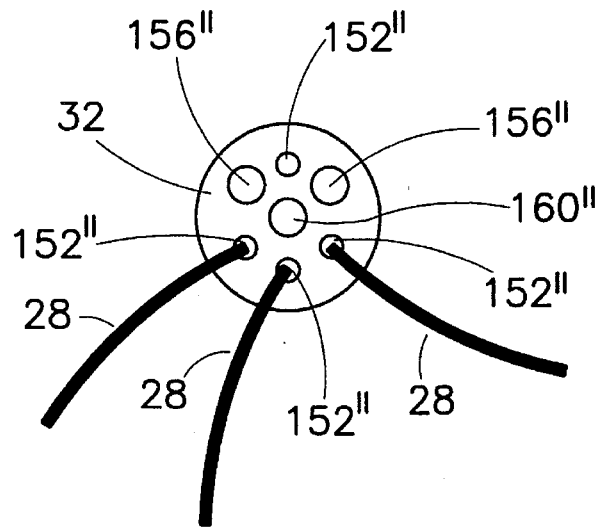
FIG. 1D is a top view of a paddle board.

The connectors 34, which are also known as CIN::APSE™ connectors, can be obtained from Cinch Connectors, 1500 Morse Avenue, Elk Grove Village, Ill. 60007. The connectors include a body 78, locating holes 66, conductors 74 and screw hole 70. The conductors are inserted into holes bored or molded in the body 78. A preferred conductor material is molybdenum plated with nickel and gold. As shown in FIGS. 1, 1A, B, 2 and 3, holes 66 are arranged to mate with rods 44, conductors 74 are arranged to connect to conductors 52 and conductive pads 152' and holes 70 are intended to match with holes 160' and 56. When assembled as shown in FIG. 1, a fastener such bolt 164, of FIG. 1C, may be placed through holes 70, 160, 160' and 56 and a nut attached and tightened to cause compression of the connectors 34, slug 36 and contact pads 150' such that a good electrical connection is formed.

Referring now to FIGS. 1D, 1, 2, and 3, there shown is a paddle board 32. The paddle board may simply be a small printed wiring board which has a contact pattern similar to connector 34. The paddle board 32 includes wires 28 to make the final connection between the power supply 12 and the dither motor 22 and between the dither pickoff 26 and processing electronics 200. The paddle board has conductive pads 152" and holes 156" and 160" to match up with the conductors 52, 74 and rods 44 and holes 56, 70 respectively of the connector unit 30 to form a good electrical connection.

Figure 4:
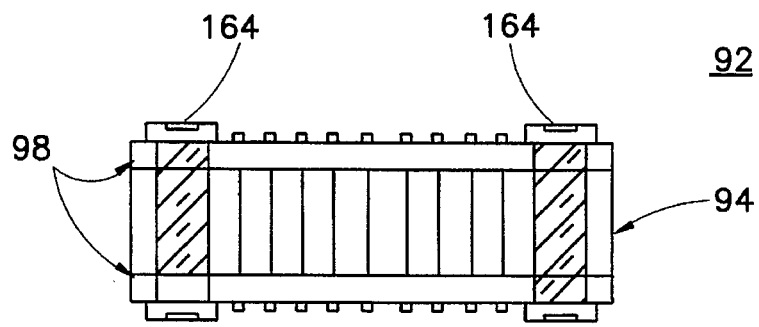
FIG. 4 is a side view of the printed wiring board connector of the present invention.

Referring now back to FIGS. 1A and B and to FIG. 4, the printed wiring boards 38, 40 also include conductive pads 83, 83'. These pads 83, 83' are used to supply power from the power supply 12 through conductive paths 13 to the conductive pad 83' in the power supply wiring board 40. The power then goes form the conductive pads 83' through a connector unit 92 shown in FIG. 4 to conductive pads 83 of the digital electronics wiring board 38 of FIG. 1A in which the power then travels through the conductive paths 213 to the support electronics 200 which reside on the first printed wiring board 38. In order to connect the two printed wiring boards, the connector unit 92 was developed. Connector unit 92 includes connector substrates 98 and slug 94. The support electronics may include, for example, well known dither stripper, random drift improvement or laser intensity monitor electronics.

Figure 4A:
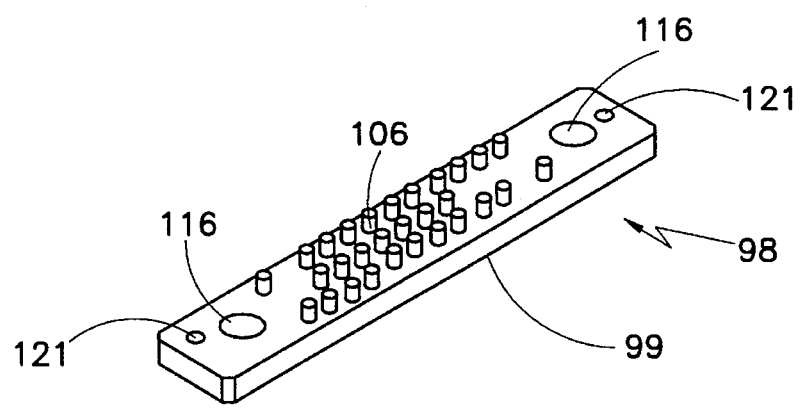
FIG. 4A is a perspective view of a connector substrate.

FIG. 4A shows a connector substrate 98 which includes body 99, conductors 106, screw holes 116 and locating holes 121. Conductors 106, which are made from a material such as molybdenum coated with nickel and gold, extend through the body 99 and above the surface of the body by a small amount such as 5 mm. Holes 116 extend through the body and are used with fastener 164 to hold together the connector unit 92. Holes 121 are used for alignment. Such connectors are also available from Cinch Connectors.

Figure 5:
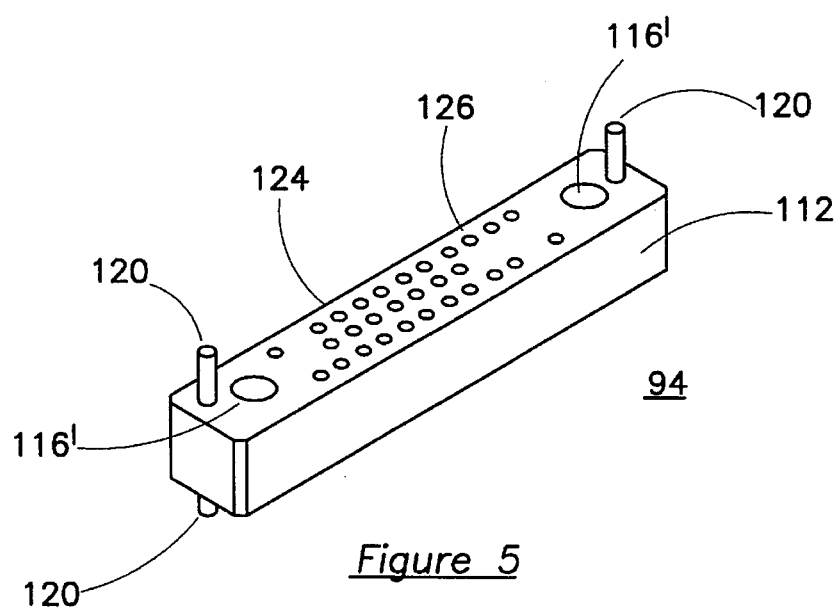
FIG. 5 is a perspective view of the substrate slug of the printed wiring board connector of FIG. 4.

Looking at FIG. 4A with FIG. 5, a slug 94 is shown which has a body 112 and a conductive pattern 124 of conductors 26 similar to the conductor pattern 102 of the connector substrate 98. Conductors 126 are preferably of a conductor such as copper and plated with nickel and golds so that the conductors 106 of the substrate may penetrate into the soft gold plating of the slug to make a good electrical connection. Rods 120 are inserted into holes 121 of the connector substrate 98 to ensure proper alignment. Holes 116' are matched up with the holes 116 of the connector substrate 98 so that a fastener 164 can be used to hold the connector unit 92 together.

Figure 6:
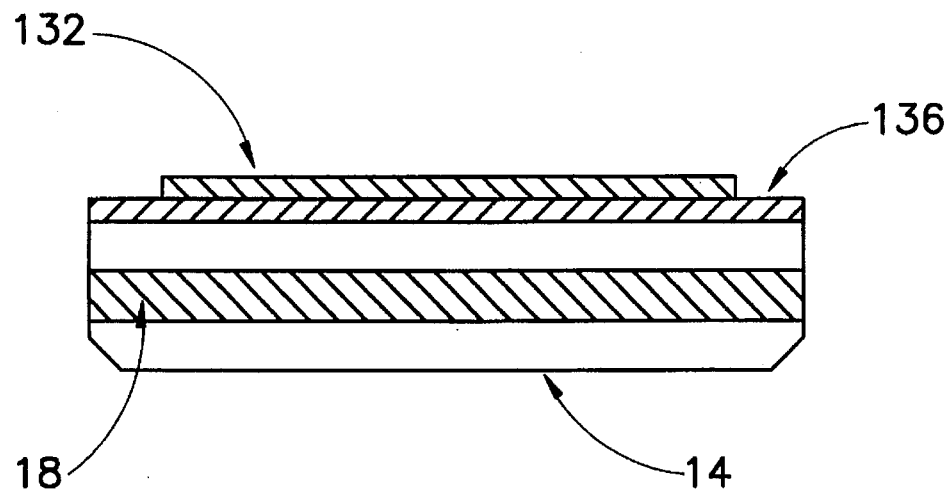
FIG. 6 shows a first embodiment of an inventive combined printed wiring board-support plate.
Figure 7:
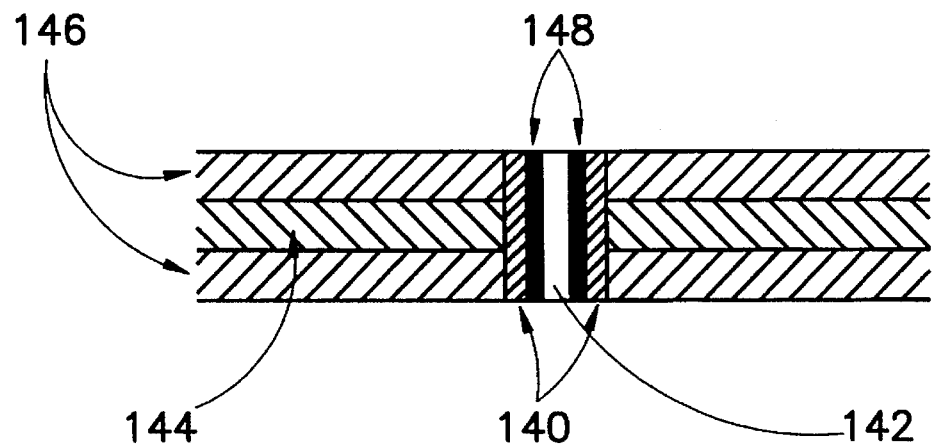
FIG. 7 shows a second embodiment of a combined printed wiring board-support plate.
Figure 8:
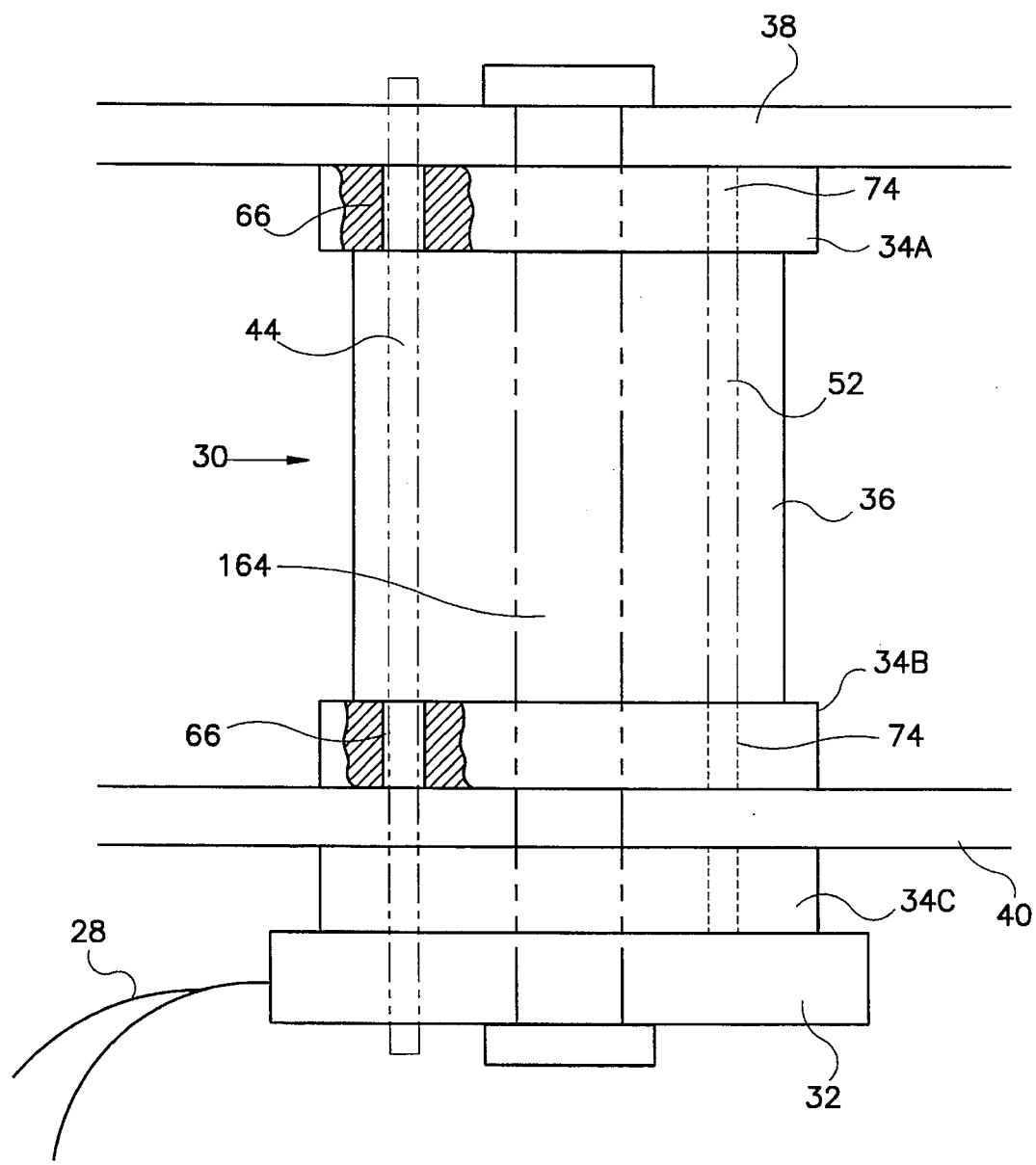
FIG. 8 shows a detail view of a connector unit.

While placing all of the above equipment in a small package is beneficial, certain structural requirements must still be met for the package, such as rigidity. Referring now to FIG. 6, there shown is a laser gyro 18 in a base with a circuit board 132/support plate 136. The combined circuit board/support plate provides the necessary structural rigidity while providing a further location within the package for locating electronics. In a second embodiment of the combined circuit board/support plate shown in FIG. 7, a metal core 144 is coated with a dielectric material 146. A hole 142 may be formed through the plate, coated with the dielectric material and then with a conductive material such as a copper plate. The metal core may be aluminum, and the dielectric material may be an epoxy. FIG. 8 shows a more detail view of the connector unit 30. As described above, the connector unit 30 provides a connection between the digital electronics wiring board 38 and the power supply wiring board 40. A fastener 164 holds the connector unit 30 together with the wiring boards 38 and 40. The connector unit 30 includes a slug 36, connectors 34A, 34B, and 34C, and a paddle board 32 which has wires 28 extending forth for connection with the dither motor 22 (shown in FIG. 1 ). Also, rods 44 are used to align the slug, 36, the connectors 34A, 34B, and 34C with the wiring boards 38 and 40 so that the conductive paths 52 will be straight.

The foregoing has been a description of a novel and non-obvious housing for a laser gyro. The description is meant by way of example, not limitation. The applicants define their invention through the claims appended hereto.

We claim:

1. A laser gyro unit, comprising:

a laser block;

an electronics printed wiring board having support electronics and a contact pad thereon and a via connecting them;

a power supply printed wiring board having a power supply and a contact pad mounted thereon and a via connecting them, the power supply adapted to provide power to the laser gyro and the support electronics; and a wiring connector, having first and second substrates and a slug, the substrates each having first and second surfaces, the substrates having a plurality of holes laid out in a predefined pattern, connecting the first and second surfaces and a conductive plug located in one of the holes, the first and second subtrates having said conductive plug located in the same hole in the predefined pattern, the conductive plug comprising a hard, electrically conductive material, the slug having first and second surfaces and a plurality of holes laid out in the predefined pattern, the slug being located between the first and second substrates, the conductors comprising a maleable material and being located in the slug and connecting the first and second surfaces, the holes being laid out in the same predefined pattern as for the first and second substrates, said slug located between said substrates, a connector unit in operation being placed between and connecting the contact pads of the electronics printed wiring board and the power supply printed wiring board.

2. The wiring connector of claim 1, wherein the conductors of the slug further comprise:

copper with gold plating.

3. The wiring connector of claim 2, wherein the conductors of the substrates further comprise:

molybdenum with gold plating.

4. The wiring connector of claim 1, wherein:

the substrates and the slug have a compression hole and a fastener, the compression hole being of such size and arranged through the substrates and slug for receiving a fastener, the fastener when installed providing a compressive force the substrates.

* * * * *